(12) United States Patent
Christen

(10) Patent No.: US 9,721,315 B2
(45) Date of Patent: Aug. 1, 2017

(54) CLAIM PROCESSING VALIDATION SYSTEM

(75) Inventor: James D. Christen, Downingtown, PA (US)

(73) Assignee: CERNER INNOVATION, INC., Kansas City, KS (US)

(*) Notice: Subject to any disclaimer, the term of this patent is extended or adjusted under 35 U.S.C. 154(b) by 2173 days.

(21) Appl. No.: 12/139,556

(22) Filed: Jun. 16, 2008

(65) Prior Publication Data

US 2009/0018866 A1    Jan. 15, 2009

Related U.S. Application Data

(60) Provisional application No. 60/949,523, filed on Jul. 13, 2007.

(51) Int. Cl.
*G06Q 50/00* (2012.01)
*G06Q 50/22* (2012.01)
*G06Q 10/10* (2012.01)

(52) U.S. Cl.
CPC ............. *G06Q 50/22* (2013.01); *G06Q 10/10* (2013.01)

(58) Field of Classification Search
CPC .......................................... G06Q 50/22–50/24
See application file for complete search history.

(56) References Cited

U.S. PATENT DOCUMENTS

| | | |
|---|---|---|
| 4,491,725 A | 1/1985 | Pritchard |
| 4,667,292 A | 5/1987 | Mohlenbrock et al. |
| 4,852,000 A | 7/1989 | Webb et al. |
| 4,857,716 A | 8/1989 | Gombrich et al. |
| 4,858,121 A | 8/1989 | Barber et al. |

(Continued)

FOREIGN PATENT DOCUMENTS

JP    11161704    6/1999

OTHER PUBLICATIONS

Yang et al., "Selecting Structural Patterns for Classification", Proceedings of the 38th Hawaii International Conference on System Sciences—2005.

(Continued)

*Primary Examiner* — Jonathan K Ng
(74) *Attorney, Agent, or Firm* — Shook, Hardy & Bacon, L.L.P.

(57) ABSTRACT

A system evaluates processing rules used for processing claim data related to reimbursement for provision of healthcare to a patient by specific payer organizations. The system includes at least one repository of information including first claim data. The first claim data processing rules and associated output data comprise first claim result information derived by applying the first claim data processing rules to the first claim data. The system also includes a source of a second claim data processing rule and a rules processor for applying the second claim data processing rule to the first claim data in deriving second claim result information corresponding to the first claim result information. A comparator compares the second claim result information with the first claim result information to identify changed result data elements and associated data fields in a claim form used in obtaining reimbursement in response to a claim. An output processor provides data representing a visual display image highlighting data fields associated with the changed result data elements.

13 Claims, 10 Drawing Sheets

(56) References Cited

U.S. PATENT DOCUMENTS

| | | |
|---|---|---|
| 5,018,067 A | 5/1991 | Mohlenbrock et al. |
| 5,077,666 A | 12/1991 | Brimm et al. |
| 5,121,945 A | 6/1992 | Thomson et al. |
| 5,191,522 A | 3/1993 | Bosco et al. |
| 5,253,164 A | 10/1993 | Holloway |
| 5,301,105 A | 4/1994 | Cummings |
| 5,307,262 A | 4/1994 | Ertel |
| 5,325,293 A | 6/1994 | Dorne |
| 5,359,509 A | 10/1994 | Little et al. |
| 5,517,405 A | 5/1996 | McAndrew et al. |
| 5,550,734 A | 8/1996 | Tarter et al. |
| 5,557,514 A | 9/1996 | Seare et al. |
| 5,704,044 A | 12/1997 | Tarter et al. |
| 5,704,371 A | 1/1998 | Shepard |
| 5,752,234 A | 5/1998 | Withers |
| 5,772,585 A | 6/1998 | Lavin et al. |
| 5,790,674 A | 8/1998 | Houvener et al. |
| 5,819,228 A | 10/1998 | Spiro |
| 5,835,897 A | 11/1998 | Dang |
| 5,867,821 A | 2/1999 | Ballantyne et al. |
| 5,915,241 A | 6/1999 | Giannini |
| 5,924,074 A | 7/1999 | Evans |
| 5,933,809 A | 8/1999 | Hunt et al. |
| 5,950,169 A | 9/1999 | Borghesi et al. |
| 5,956,689 A | 9/1999 | Everhart |
| 5,974,389 A | 10/1999 | Clark et al. |
| 5,991,733 A | 11/1999 | Aleia et al. |
| 6,182,070 B1 | 1/2001 | Megiddo et al. |
| 6,189,005 B1 | 2/2001 | Chakrabarti et al. |
| 6,208,973 B1 | 3/2001 | Boyer et al. |
| 6,263,330 B1 | 7/2001 | Bessette |
| 6,282,531 B1 | 8/2001 | Haughton et al. |
| 6,317,783 B1 | 11/2001 | Freishtat et al. |
| 6,336,139 B1 | 1/2002 | Feridun et al. |
| 6,341,265 B1 | 1/2002 | Provost et al. |
| 6,343,271 B1 | 1/2002 | Peterson et al. |
| 6,345,288 B1 | 2/2002 | Reed et al. |
| 7,006,893 B2 | 2/2006 | Hart et al. |
| 7,013,284 B2 | 3/2006 | Guyan et al. |
| 7,072,842 B2 | 7/2006 | Provost et al. |
| 7,127,456 B1* | 10/2006 | Brown et al. |
| 7,392,471 B1* | 6/2008 | Ford et al. ............... 715/234 |
| 7,801,744 B2 | 9/2010 | Patterson |
| 7,831,442 B1* | 11/2010 | Chappel ............... 705/2 |
| 7,870,009 B2 | 1/2011 | Patterson |
| 7,881,950 B2 | 2/2011 | Patterson |
| 2001/0034618 A1 | 10/2001 | Kessler et al. |
| 2001/0037224 A1 | 11/2001 | Eldridge et al. |
| 2001/0054155 A1 | 12/2001 | Hagan et al. |
| 2002/0004727 A1 | 1/2002 | Knaus et al. |
| 2002/0010597 A1 | 1/2002 | Mayer et al. |
| 2002/0019754 A1 | 2/2002 | Peterson et al. |
| 2002/0032583 A1 | 3/2002 | Joao |
| 2002/0032584 A1 | 3/2002 | Doctor et al. |
| 2002/0035488 A1 | 3/2002 | Aquila et al. |
| 2002/0120473 A1 | 8/2002 | Wiggins |
| 2002/0133503 A1 | 9/2002 | Amar et al. |
| 2002/0147867 A1 | 10/2002 | Satlow |
| 2002/0198741 A1 | 12/2002 | Randazzo |
| 2003/0014280 A1 | 1/2003 | Jilinskaia et al. |
| 2003/0018496 A1 | 1/2003 | Hambright et al. |
| 2003/0050804 A1 | 3/2003 | Hendershot |
| 2003/0055679 A1 | 3/2003 | Soll et al. |
| 2003/0069760 A1 | 4/2003 | Gelber |
| 2003/0083906 A1 | 5/2003 | Howell et al. |
| 2003/0149594 A1 | 8/2003 | Beazley et al. |
| 2003/0158760 A1 | 8/2003 | Kannenberg |
| 2003/0191665 A1* | 10/2003 | Fitzgerald et al. ............... 705/2 |
| 2003/0191667 A1* | 10/2003 | Fitzgerald et al. ............... 705/2 |
| 2003/0191669 A1 | 10/2003 | Fitzgerald et al. |
| 2003/0208379 A1 | 11/2003 | Haskey et al. |
| 2003/0216831 A1 | 11/2003 | Hart et al. |
| 2003/0229516 A1 | 12/2003 | Nickerson |
| 2004/0078228 A1 | 4/2004 | Fitzgerald et al. |
| 2004/0153336 A1 | 8/2004 | Virdee et al. |
| 2005/0010452 A1* | 1/2005 | Lusen ............................ 705/3 |
| 2005/0010863 A1* | 1/2005 | Zernik ...................... 715/511 |
| 2005/0033609 A1 | 2/2005 | Yang |
| 2005/0137912 A1 | 6/2005 | Rao |
| 2005/0216315 A1 | 9/2005 | Andersson |
| 2006/0041487 A1 | 2/2006 | Santalo et al. |
| 2006/0080142 A1* | 4/2006 | Hart et al. ................... 705/2 |
| 2006/0149784 A1 | 7/2006 | Tholl et al. |
| 2006/0150107 A1 | 7/2006 | Leung et al. |
| 2008/0027759 A1 | 1/2008 | Flam et al. |
| 2014/0058757 A1 | 2/2014 | Patterson |

OTHER PUBLICATIONS

International Search Report for Application No. PCT/US03/10191 dated Nov. 19, 2003.

DeNovis, Inc., "Claims Administration", printed from website on Sep. 20, 2002 http://www.denovis.com/product/claims.htm.

* cited by examiner

FIG. 3

Narrow Ridge General Hosp | SRN9470 | 111
1101 Main Street | 10000379
Phoenixville, PA, 19460
111-555-1001 x1001111-555 | 240799343 | 010604 | 010604

PATIENT NAME: Smith, test 1129 0
PATIENT ADDRESS: 1312 Shunk St, Phila, PA, 19148, US BIRTHDATE: 01011970 | SEX: 2 | DATE: 010604 | 09 | 3 | 3 | 14 | 01 | 20 | 22 | 23 | 24 | 26 | 28 | 30 | 32

← HIGHLIGHTED CHANGES 307

| OCCURRENCE | | | | | | | | |
|---|---|---|---|---|---|---|---|---|
| A1 | 010170 | A2 | 010102 | B1 | 010170 | B2 | 010102 | 71 092702 093002 |
| C1 | 010170 | 11 | 010170 | 18 | 010170 | 34 | 010170 | |

Test Revcode
1312 Shunk St
Phila, PA. 19148

| CODE | VALUE CODES AMOUNT | CODE | VALUE CODES AMOUNT | CODE | VALUE CODES AMOUNT |
|---|---|---|---|---|---|
| a 37 | 1 | 40 | 500 | 42 | 1000 |
| b 23 | 1500 | 05 | 2000 | 06 | 2500 |
| c 13 | 3000 | 15 | 3500 | 57 | 1 |
| d 60 | 1 | 39 | 1 | D3 | 10585 |

| REV CD | DESCRIPTION | HCPCS/RATE/HIPPS CODE | SERV DATE | SERV UNITS | TOTAL CHARGES | NON-COVERED CHARGES |
|---|---|---|---|---|---|---|
| 480 | VIRAL PNEUMONIA | 93350 | 010604 | 6 | 27000 | 3330 |
| 001 | Broken Thumb | | | 0 | 27000 | 000 |
| 003 | Wrist Fracture | | | 1 | 300 | 000 |
| 004 | | | | 1 | 400 | 000 |
| 005 | | | | 1 | 500 | 000 |
| 006 | Tooth fix | | | 1 | 600 | 000 |
| 007 | Hair Split | | | 2 | 700 | 000 |
| 008 | Ear Dripping | | | 1 | 800 | 000 |
| 009 | Broken Jaw | | | 9 | 900 | 000 |
| 010 | Nose Bleeding | | | 1 | 1000 | 000 |
| 011 | Eye pain | | | 1 | 1100 | 000 |
| 012 | Cardiac Surgery | | | 4 | 1200 | 000 |
| 013 | Brain Damage | | | 6 | 1300 | 000 |
| 014 | Lyme | | | 4 | 1400 | 000 |
| 015 | Rhuematism | | | 0 | 1500 | 000 |
| 016 | Arthritis | | | 5 | 1600 | 000 |
| 017 | knee pain | | | 2 | 1700 | 000 |
| 018 | back pain | | | 1 | 1800 | 000 |
| 020 | headache | 020 | | 1 | 1900 | 000 |
| 021 | Indigestion | | | 1 | 2000 | 000 |
| 021 | Congestion | | | 3 | 2100 | 000 |
| 022 | Hay fever | | | 1 | 2200 | 000 |

PAGE 1 OF 3 | CREATION DATE 020604 | TOTALS ⇒ 56500 | 3330

| PAYER NAME | HEALTH PLAN ID | | | PRIOR PAYMENTS | EST. AMOUNT DUE | |
|---|---|---|---|---|---|---|
| Cigna Dental | | Y | N | 000 | 000 | |
| Cigna Dental | | Y | N | 000 | 000 | OTHER |
| Cigna Dental | | Y | N | 000 | 000 | PRV ID |

| INSURER'S NAME | INSURER'S UNIQUE ID | GROUP NAME | INSURANCE GROUP NO. |
|---|---|---|---|
| Regression, Test10 | 1 | | 8888 |
| Regression, Test10 | 1 | | 8888 |
| Regression, Test10 | 1 | | 8888 |

| TREATMENT AUTHORIZATION CODES | DOCUMENT CONTROL NUMBER | EMPLOYER NAME |
|---|---|---|
| 233424879 | | 5555 |
| 233424879 | | 5555 |
| 233424879 | | 5555 |

E807.2 | 003.21 | 021.0 | 374.21 | 521.8 | E999.1 | V57.21 | 998.51 | E807.0

ADMIT DX: 134.1 | PATIENT REASON DX: | PPG CODE: | E807.2

PRINCIPLE PROCEDURE: 00 55 010103 | OTHER PROCEDURE: 00 56 010203 | OTHER PROCEDURE: 00 57 010303

ATTENDING: LAST Arney FIRST Dominic QUAL UP oth000
OPERATING: LAST Performing FIRST Dominic QUAL UP oth000
OTHER: LAST Other FIRST Dominic QUAL UP oth000
OTHER 77

REMARKS

UB-04 CMS-1450    APPROVED OMB NO.    THE CERTIFICATION ON THE REVERSE APPLY TO THIS BILL AND ARE MADE A PART HEREOF.

FIG. 4

```
ISA*00*
*ZZ*123456789012345*ZZ*123456789012345*070510*1120*U*00401*000000371*1*
P*:~
GS*HC*123456789012345*123456789012345*20070510*1120*1327*X*004010X096A1
~
ST*837*XYZ113001~
BHT*0019*00*ABC*20070510*1120*CH~
REF*87004010X096A1~
NM1*41*2*ABC*20070510*1120*CH~
REF*87*004010X096A1~
NM1*41*2ABC MEMORIAL HOSPITAL*****SUBMITTERID~
PER*IC*SUBMITTER CONTACT*TE*5558595777~
NM1*40*2*PAYER OPEN ACCESS*****46*88888~
HL*2*1*22*1~
NM1*85*2*ABC MEMORIAL HOSPITAL*****XX*9999998432~
HL*2*1*22*1~
SBR*P***3207020******CI~
NM1*IL*1*BIXBY*SANDRA*L***MI*U0999991903~
N3*4255 XYZ DRIVE D~
N4*NOWHERE*TX*99997*US~
DMG*D8*19891103*F~
CLM*SRN999999*3465.10***13:A:1*Y**Y*Y*********Y~
DTP*434*RD8*20061217-20061218~
DTP*435*DT*200612172225~
CL*1*7*01~
AMT*F3*0.00~
REF*EA*7006345~
NTE*ADD*AIB            ER SERVICES           PPO~
HI*BK:592.1~
HI*BF:591*BF:314.01~
HI*BH:11:D8:20061217~
HI*BE:A3:::2772.08~
NM1*71*1*FANELLI*CLAUDIO****24*999994461~
REF*G2*09993~
REF*1G*C09993~
NM1*FA*2*ABC HOSPITAL****24*34999461~
```

FIG. 5

```
ISA*00*          *00*
*ZZ*123456789012345*ZZ*123456789012345*070510*1120*U*00401*000000371*1*
P*:~
GS*HC*123456789012345*123456789012345*20070510*1120*1327*X*004010X096A1
~
ST*837*XYZ113001~
BHT*0019*00*ABC*20070510*1120*CH~
REF*87004010X096A1~
NM1*41*2ABC MEMORIAL HOSPITAL*****46*SUBMITTERID~
PER*IC*SUBMITTER CONTACT*TE*5558595777~
NM1*40*2*PAYER OPEN ACCESS*****46*88888~
HL*1**20*1~
NM1*85*2*ABC MEMORIAL HOSPITAL*****XX*9999998432~
HL*2*1*22*1~
SBR*P**3207020******:CI~
NM1*IL*1*BIXBY*SANDRA*L***MI*U0999991903~
N3*4255 XYZ DRIVE D~
N4*NOWHERE*TX*99997*US~
DMG*D8*19891103*F~
CLM*SRN999999*3465.10***13:A:1*Y**Y*Y*********Y~
DTP*434*RD8*20061217-20061218~
DTP*435*DT8*20061217225~
CL*1*7*01~
AMT*F3*0.00~
REF*EA*7006345~
NTE*ADD*AIB          ER SERVICES          PPO~
HI*BK:592.1~
HI*BF:591*BF:314.01~
HI*BH:11:D8:20061217~
HI*BE:A3:::2772.08~
NM1*71*1*FANELLI*CLAUDIO****24*999994461~
REF*G2*09993~
603 — REF*1G*C09993~
       NM1*72*1*SYDNEY*MARIA*KAY****24*999994461~
605 — REF*G2*04999~
       REF*1G*C09990~
607 — NM1*72*2*ABC HOSPITAL*****24*34999461~
```

HEALTH INSURANCE CLAIM FORM

APPROVED BY NATIONAL UNIFORM CLAIM COMMITEE 08/05

[1500]

| | | |
|---|---|---|
| 1. MEDICARE [X] (Medicare #) MEDICAID [ ] (Medicaid #) TRICARE CHAMPUS [ ] (Sponsor's SSN) CHAMPVA [ ] (Sponsor's SSN) GROUP HEALTHPLAN [ ] (SSN or ID) FECA BLK LUNG [ ] (SSN) OTHER [ ] (ID) | 1a. INSURED'S I.D. NUMBER (For Program in here 1) | |
| 2. PATIENT'S NAME (Last Name, First Name, Middle Initial)<br>TestPFO Dinnell | 3. PATIENT'S BIRTH DATE<br>10 10 50 M [ ] F [X] | 4. INSURED'S NAME )Last Name, First Name, Middle Initial)<br>SpouseWF38 GuarantorA |
| 5. PATIENTS ADDRESS (NO., Street)<br>12 Apple Way | 6. PATIENT RELATIONSHIP TO INSURED<br>Self [ ] Spouse [X] Child [ ] Other [ ] | 7. INSURED'S ADDRESS (No., Street) |
| CITY<br>Paoli / STATE PA | 8. PATIENT STATUS<br>Single [ ] Married [X] Other [ ] | CITY / STATE |
| ZIP CODE 123456789 / TELEPHONE (INCLUDE AREA CODE) (610)5559988 | Employed [ ] Full-Time Student [ ] Part-Time Student [ ] | ZIP CODE / TELEPHONE (Include Area Code) ( ) |
| 9. OTHER INSURED'S NAME (Last Name, First Name, Middle Initial) | 10. IS PATIENT'S CONDITION RELATED TO: | 11. INSURED POLICY GROUP OR FECA NUMBER |
| a. OTHER INSURED'S POLICY OR GROUP NUMBER | a. EMPLOYMENT? (Current of Previous)<br>[ ] YES [X] NO | a. INSURED'S DATE OF BIRTH<br>10 05 65 M [ ] F [ ] |
| b. OTHER INSURED'S DATE OF BIRTH<br>10 05 65 SEX M [X] F [ ] | b. AUTO ACCIDENT? PLACE (State)<br>[ ] YES [X] NO | b. EMPLOYER'S NAME OR SCHOOL NAME |
| c. EMPLOYER'S NAME OR SCHOOL NAME<br>11111 | c. OTHER ACCIDENT?<br>[ ] YES [X] NO | c. INSURANCE PLAN NAME OR PROGRAM NAME |
| d. INSURANCE PLAN NAME OR PROGRAM NAME<br>123 456 7890 | 10d. RESERVED FOR LOCAL USE | d. IS THERE ANOTHER HEALTH BENEFIT PLAN?<br>[X] YES [ ] NO If yes, return to and complete item 9 a-d |

READ BACK OF FORM BEFORE COMPLETING & SIGNING THIS FORM.

12. PATIENTS OR AUTHORIZED PERSONS SIGNATURE I authorize the release of any medical or other information necessary to process this claim. I also request payment of government benefits either to myself or to the party who accepts assignment below.

SIGNED OnFile DATE _____

13. INSURED'S OR AUTHORIZED PERSON'S SIGNATURE i authorize payment of medical benefits to the undersigned physician or supplier for services described below.

SIGNED OnFile

| | | |
|---|---|---|
| 14. DATE OF CURRENT ILLNESS (First symptom) OR INJURY (Accident) OR PREGNANCY(LMP) | 15. IF PATIENT HAS HAD SAME OR SIMILAR ILLNESS GIVE FIRST DATE | 16. DATES PATIENT UNABLE TO WORK IN CURRENT OCCUPATION FROM TO |
| 17. NAME OF REFERRING PROVIDER OR OTHER SOURCE | 17a.<br>17b NPI | 18. HOSPITALIZATION DATES RELATED TO CURRENT SERVICES FROM 09 01 03 TO |
| 19. RESERVED FOR LOCAL USE | | 20. OUTSIDE LAB? $ CHARGES<br>[X] YES [ ] NO 0 |
| 21. DIAGNOSIS OR NATURE OF ILLNESS OR INJURY (Relate Items 1,2,3 or 4 to Iern 24E by Line<br>1. 940.0 3.<br>2. 4. | | 22. MEDICAID RESUBMISSION CODE ORIGINAL REF. NO.<br>23. PRIOR AUTHORIZATION NUMBER |

| 24.A: DATE(S) OF SERVICE From MM DD YY — To MM DD YY | B. PLACE OF SERVICE | C. EMG | D. PROCEDURES SERVICES, OR SUPPLIES (Explain Unusual Circumstances) OPT/HCPCS \| MODIFIER | E. DIAGNOSIS POINTER | F. S CHARGES | G. DAYS OR UNITS | H. FOR Family Plan | I. ID QUAL | J. RENDERING PROVIDER ID # |
|---|---|---|---|---|---|---|---|---|---|
| 1 | 09 01 03 09 01 03 | 22 | | 36000 | 1 | 22100 | 1 | Y | NPI |
| 2 | 09 08 03 09 08 03 | 22 | | 36000 | 1 | 22200 | 1 | Y | NPI |
| 3 | 09 15 03 09 15 03 | 22 | | 36000 | 1 | 22300 | 1 | Y | NPI |
| 4 | | | | | | | | | NPI |
| 5 | | | | | | | | | NPI |
| 6 | | | | | | | | | NPI |

| | | | | | |
|---|---|---|---|---|---|
| 25. FEDERAL TAX I.D. NUMBER SSN EIN<br>01=1000011 [x] [ ] | 26. PATIENTS ACCOUNT NO.<br>SRN2579 | 27. ACCEPT ASSIGNMENT? [x] YES [ ] NO | 28. TOTAL CHARGE<br>$ 666000 | 29. AMOUNT PAID<br>$ 000 | 30. BALANCE DUE<br>000 |
| 31. SIGNATURE OF PHYSICIAN OR SUPPLIER INCLUDING DEGREES OR CREDENTIALS (I certify that the statements on the reverse apply to this bill and are made a part thereof)<br>OnFile<br>SIGNED DATE | 32. SERVICE FACILITY LOCATION INFORMATION<br>Narrow Ridge Renal Clinic<br>a. b. | | 33. BILLING PROVIDER INFO PH ( )<br>Specialty Doctors Group Practi<br>3301 Main Street<br>Frazer, PA 19355<br>a. b. | | |

NUCC Instruction Manual available at: www.nucc.org

CLAIM PROCESSING VALIDATION SYSTEM

This is a non-provisional application of provisional application Ser. No. 60/949,523 filed Jul. 13, 2007, by J. Christen.

FIELD OF THE INVENTION

This invention concerns a system for evaluation of rules used for processing claim data related to reimbursement for provision of healthcare to a patient by specific payer organizations involving comparing results of claim processing using different rules.

BACKGROUND OF THE INVENTION

A healthcare provider organization that provides a patient with healthcare services (e.g., diagnostic X-Ray), sends claim information to a payer organization (e.g., a patient medical insurer) with a request for reimbursement. A payer organization requires formatting the claim information in a specific format using rules and guidelines provided by standards groups, such as ANSI (American National Standards Institute) X12 standards for EDI (Electronic Data Interchange) transactions or associated with a UB04 transaction form from the NUBC (National User Billing Committee), for example. A payer organization may require change of a mandatory format of a claim transaction form so that a number of versions of claims transactions and claims forms exist that are tailored to requirements of a payer organization. The customization of a claim transaction form having a standard format is burdensome especially if a format change is required. A payer organization may require different information for specific fields, depending on provided hospital services, for example and involve payer organization specific rule changes. Further, during implementation of such changes to correct billing programs, a payer organization may reject incomplete claims which causes cash flow delays to a healthcare provider.

Known systems support limited validation of claim transaction processing rules and are hampered by restrictions in assessing the effect of processing rule changes on claim data. Some known systems provide a facility for format certification, however, a claim that passes such certification may not be valid and compatible with specific payer organization rules, because the format certification verification process is not capable of sophisticated reimbursement calculations and format takes precedence over associated operation instruction. Known systems are typically not capable of calculating reimbursement and submitting processed data as claims forms or as EDI transactions without adversely compromising a regular claims production system. A system according to invention principles addresses these deficiencies and related problems.

SUMMARY OF THE INVENTION

A Claims Validation System (CVS) evaluates the effect of changing claim generation rules on claim reimbursement and corrects identified problems prior to implementing the rules into a production system and enables visual indication of the effect of proposed rule adaptations in processing test claim data. A system evaluates processing rules used for processing claim data related to reimbursement for provision of healthcare to a patient by specific payer organizations. The system includes at least one repository of information including first claim data. The first claim data processing rules and associated output data comprise first claim result information derived by applying the first claim data processing rules to the first claim data. The system also includes a source of a second claim data processing rule and a rules processor for applying the second claim data processing rule to the first claim data in deriving second claim result information corresponding to the first claim result information. A comparator compares the second claim result information with the first claim result information to identify changed result data elements and associated data fields in a claim form used in obtaining reimbursement in response to a claim. An output processor provides data representing a visual display image highlighting data fields associated with the changed result data elements.

BRIEF DESCRIPTION OF THE DRAWING

FIGS. 3 and 4 illustrate UB04 claim reimbursement forms prepared using first and second different sets of claim processing rules based on a common set of input claim data, according to invention principles.

FIGS. 5 and 6 illustrate first and second different sets of claim processing rules used for processing a common set of input claim data to provide different claim reimbursement form data fields, according to invention principles.

FIG. 7 shows a partial trace log recording execution of rules in claim data processing, according to invention principles.

FIGS. 8 and 9 illustrate a particular claim reimbursement form prepared using first and second different sets of claim processing rules based on a common set of input claim data, according to invention principles.

DETAILED DESCRIPTION OF THE INVENTION

Figure 1:
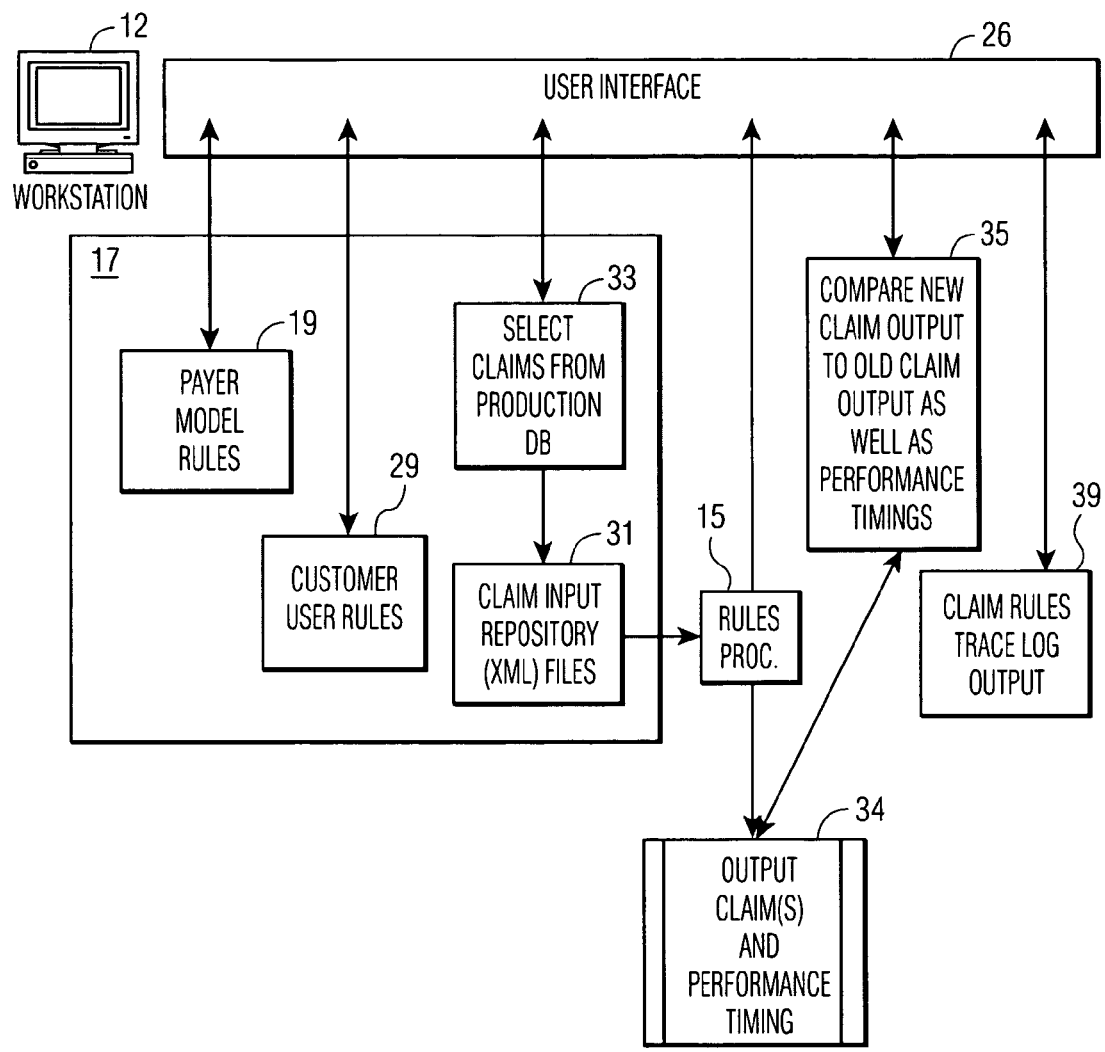
FIG. 1 shows a system for evaluating processing rules used for processing claim data related to reimbursement for provision of healthcare to a patient by specific payer organizations, according to invention principles.

A Claims Validation System (CVS) according to invention principles, automatically evaluates the effect of changing claim data processing and claim form completion and generation rules prior to implementation of the rules in a production (non-test) environment. The system identifies and highlights changes in claim data and changes in data in a prepared form to facilitate user identification of the changes. The system in one embodiment is isolated and independent from a production claims system and is provided as an Application Service Provider (ASP) system or as a stand-alone system, for example. The system includes components that code and validate rules for processing electronic transactions and data reproduced in the form of a paper claim. System components are nested and the system supports subscribers or users generating new rules to supplement or override model rules. The system produces output comprising Electronic Data Interchange (EDI) compatible claim transaction data or data representing test claims in paper form for use in validating a rule change without affecting an accounts receivable process and addresses the problem of determining rule change effect on claims reimbursement, for example.

The Claims Validation System displays claim data in a layout that visually highlights changes to a payer organization standard claim format resulting from proposed adaptations to healthcare payer organization rules. The Claims Validation System automatically compares a proposed output format (paper claims or EDI transactions) to a number of prior versions of formats using an intuitive Graphical User Interface (GUI). Changes from a prior claim format version are automatically highlighted (e.g., in yellow or by another visual attribute) in a displayed newer version. The system uses patient claim data edited to remove patient demographic information and patient identifying information, to test the effect of claim processing rule changes. Sample claims are chosen from one or more different sources including sources of, random samples of claims from current claim production or from a catalog of claims that represent special cases containing complex claim reimbursement parameters. Either a single claim or a group of claims is selected for use in rule change evaluation to validate the effect of rule change. The system isolates and protects model payer organization rules (as "read only/do not change") from healthcare provider organization alteration. For this purpose, the system isolates a payer organization from rules created or altered by a healthcare provider organization. In performing a rule change validation, the system integrates use of both payer organization and healthcare provider organization rules in a correct sequence to perform validation according to a reimbursement schema. Further, the system simulates integrated system performance (throughput) of claims to predict computer system resource needs required to support a rule change. A trace log indicating individual rule execution in processing a claim, is performed for use in determining a sequence in which rules are executed to produce a claim or EDI transaction, for example.

A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device. A processor may use or comprise the capabilities of a controller or microprocessor, for example. A processor may be electrically coupled to any other processor enabling interaction and/or communication therebetween. A display processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a display processor and enabling user interaction with a processor or other device and associated data acquisition and processing functions.

The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps (e.g., of FIG. 10) herein may be performed automatically or wholly or partially in response to user command. An activity (including a step) performed automatically is performed in response to executable instruction or device operation without user direct initiation of the activity. Workflow comprises a sequence of tasks performed by a device or worker or both. An object or data object comprises a grouping of data, executable instructions or a combination of both or an executable procedure.

FIG. 1 shows system 10 for evaluating processing rules used for processing claim data related to reimbursement for provision of healthcare to a patient by specific payer organizations. System 10 includes a processing device (e.g., workstation or portable device such as a notebook, Personal Digital Assistant, cell phone) 12, at least one repository 17 and a user interface 26. User interface 26 provides a Graphical User Interface (GUI) that links together a file and folder structure that stores both input claim data in XML format and output form data in Word document format, and employs executable procedures to manipulate and produce these files. In one embodiment, each input and output file references one claim. User interface 26 provides data representing display images for presentation on processing device 12. At least one repository 17 includes information including first claim data 33, first claim data processing rules 19, 29 and associated output data comprising first claim result information derived by applying the first claim data processing rules to the first claim data.

Repository 17 also includes a source of a second claim data processing rule comprising a new claim data processing rule or an adapted (e.g., edited) existing claim data processing rule derived or entered via user interface 26, for example. Rules processor 15 applies the second claim data processing rule (in conjunction with rules of said first claim data processing rules) to the first claim data in deriving second claim result information corresponding to the first claim result information. Comparator 35 compares the second claim result information with the first claim result information to identify changed result data elements and associated data fields in a claim form used in obtaining reimbursement in response to a claim. Output processor 34 provides data representing a visual display image highlighting data fields associated with the changed result data elements. Trace processor 39 provides data representing a trace of execution of rules including the second claim data processing rule applied in processing the first claim data enabling a user to verify the second claim data processing rule has been executed.

In operation, a user makes a rule change involving updating appropriate code that implements a rule, in an integrated development environment (IDE). The user employs a GUI display image provided by user interface 26 to select a saved claim or claims from an input claims directory 33 (converted to XML format and stored in repository 31) for processing with updated (changed) claim data processing rules. Validation of the changed claim data processing rules is initiated in response to user selection of a button in the GUI and a resultant output form document provided by output processor 34 is automatically named and stored in an output form directory in unit 34. The GUI provided by user interface 26 allows a user to compare, claim data processed using current changed processing rules and presented in a form, with any saved previous claim data form output derived from the output form directory in unit 34. Comparator 35 incorporates a default comparison function for comparing a latest previously processed claim form output with a corresponding claim form output provided using an earlier version of claim processing rules derived using the same input claim data or input claim data for each claim in a group of claims. Rules processor 15 automatically searches for a previously processed claim form output based on a file naming convention. The compared output is displayed to a user in the GUI. The file naming convention comprises, for an input claim data file, INPUT <user supplied unique name>.xml (e.g., UB04BCBS.xml), a corresponding OUTPUT is <INPUT unique name>_<generated date_timestamp>.doc (e.g., UB04BCBS_20070710_130216.doc).

System 10 displays claim processing validation results and automatically compares a latest claim form output with previously processed claim form output. The system highlights changed elements in a form and records duration times of claim data processing execution. After one or more iterations of claim data processing, there is enough information to validate changed processing rules, prior to incorporating the changed rules into a non-test production system. The validation process uses a consistent set of sample claims data derived from unit 33. System 10 automates the validation of a change in claim data processing payer organization rules enabling a user to verify whether a rule change operated as desired and whether there were unintended undesirable consequences. A user is able to readily select exemplary input claim data cases to verify processing of relevant claim data form type and payer organization claim data, for example, prior to a validation test. Input claim data is selectable from a current production claim database or from a prior group of saved claims in database 33. Use of a large sample of claims ensures that modified rules are "production ready" and that performance throughput is sustained. Trace log processor 39 enables an error be traced to a particular source claim data processing rule.

In one embodiment the claim data processing payer organization rules reside in a remote third party rules engine accessed via a network (as an alternative to database 19) or in another location in another embodiment, accessed via an integrated development environment (IDE). Model payer organization rules in unit 19 are "read-only" and updated periodically in response to received update data from payer organizations. User (customer) organization rules in database 29 are created and maintained by a user organization. System 10 employs model payer organization rules in unit 19 and user organization rules in unit 29 in a particular sequence compatible with payer organization requirements to validate a proposed change to claim data processing rules. Selected claims incorporating claim data derived from Production claims database 33 are transformed into an XML format and placed into repository 31 for validation. Repository 31 of XML claim data is used as a database of examples to validate proposed changes.

Figure 2:
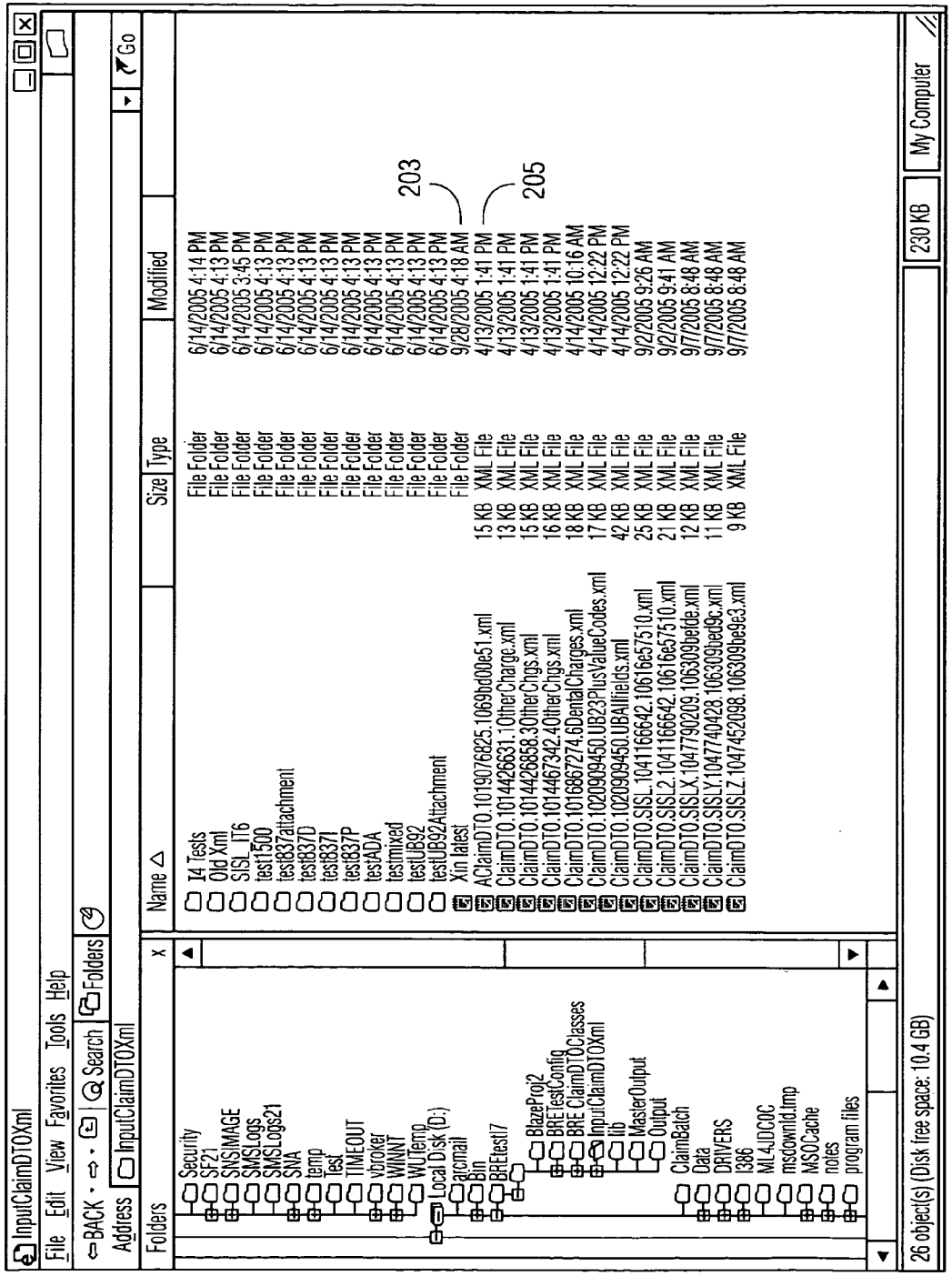
FIG. 2 shows a user interface display image illustrating a list of XML claim data files used to evaluate effect of change in claim processing rules, according to invention principles.

FIG. 2 shows a user interface display image illustrating a list of XML claim data files, e.g., files 203 and 205 in repository 31 used to evaluate an effect of a change in payer organization and user specific claim processing rules. Repository 31 contains many different types of claims, including those for Medicare, Medicaid, and specific payer organizations. System 10 also includes an XML editor enabling a user to edit claim data to be used in testing changed claim processing rules to meet testing parameters. In this way, results of multiple different test cases are acquired and stored in repository 17 for consistent long-term regression testing.

In system 10 (FIG. 1), rules processor 15 initiates validation of changed claim processing rules in response to user selection of one or more claims in XML claims repository 31 via a claim selection display image provided in a web browser by user interface 26 on workstation 12. Rules processor 15 processes the selected claims with a changed version of one or more rules of either, or both, payer organization rules (e.g., required by payer organization standards) and any user organization specific or user organization customized rules. Processed claim output data is generated in XML format and stored in an output file directory in repository 17. Rules processor 15 determines duration times of claim processing execution and associates data representing the determined times with data identifying corresponding rules processed in a repository in order to support evaluation of performance of claim processing throughput. Comparator 35 automatically compares a latest claim form output with a previously processed corresponding claim form output using the same input claim data and the system highlights changed elements (e.g., in yellow) in a form. The process of validating a changed claim processing rule consistently uses the same sample input claims data and system 10 displays results of validation processing via user interface 26 on workstation 12.

Figure 3:
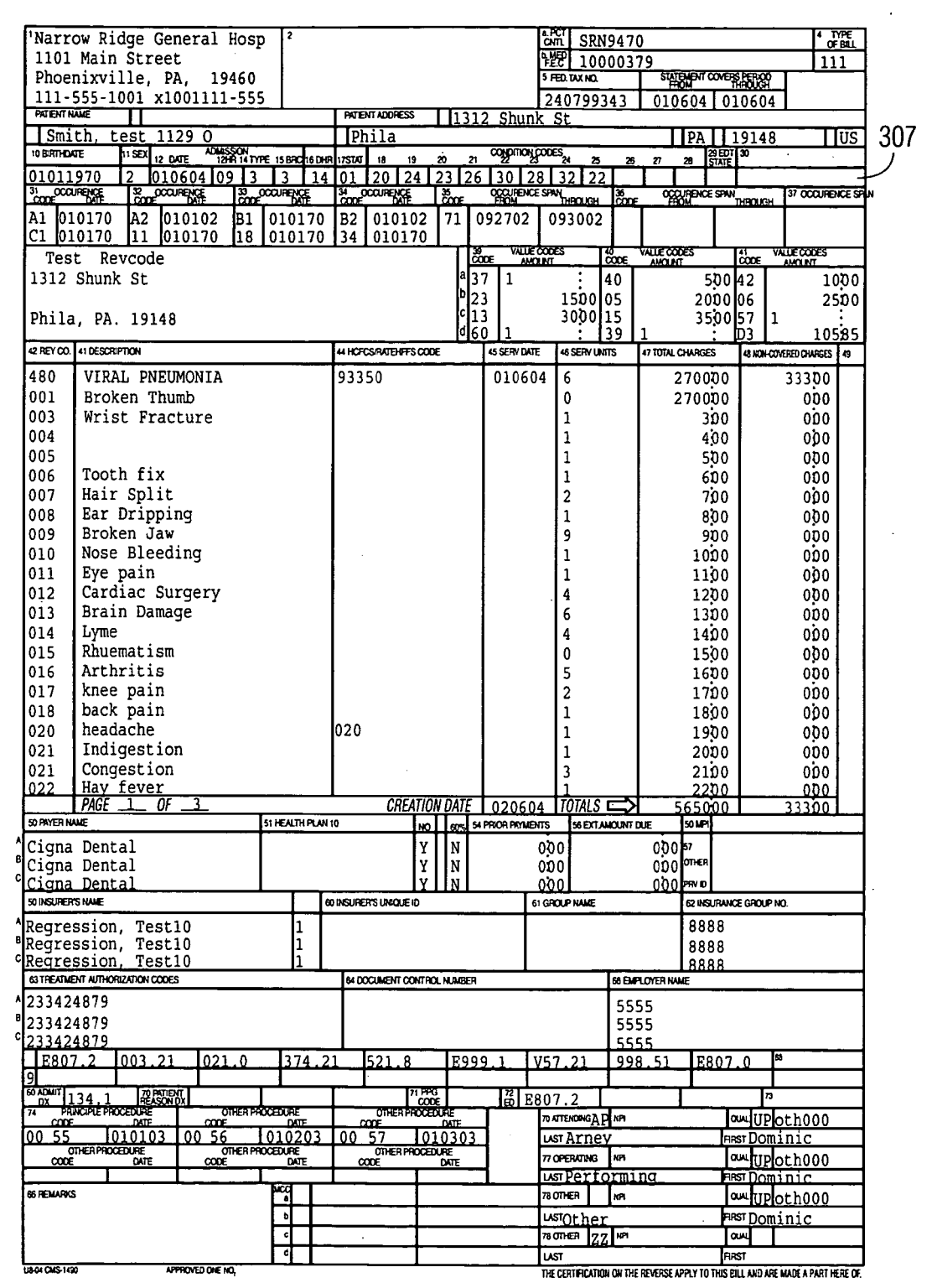

FIGS. 3 and 4 illustrate UB04 claim reimbursement forms prepared using system 10 employing first and second different sets of claim processing rules based on a common set of input claim data. Specifically, FIG. 4 highlights (e.g., in yellow or with any other visual attribute) changed condition codes in row 307 of a UB04 claim reimbursement form derived using a second set of claim processing rules including payer organization specific rules and user organization specific rules. FIG. 4 illustrates that the second set of rules change condition codes in locations identified by Form Locators 19, 21, 22, 23, 24, 25 on the UB04 claim reimbursement form. The highlighted differences indicate the condition codes of FIG. 4 are now in an ascending sort sequence order enabling a user to readily determine the desired change has been successfully implemented. Comparator 35 automatically identifies and highlights the changed codes following processing of the common set of input claim data by rules processor 15. FIG. 3 illustrates corresponding previous condition codes in row 303 of a corresponding UB04 claim reimbursement form derived using a first set of claim processing rules including payer organization specific rules and user organization specific rules. The second set of claim processing rules are derived by changing, deleting, updating or replacing one or more rules of the first set of claim processing rules. Rules processor 15 also determines (and highlights in a display) the duration of execution of the claim processing rules involved in deriving the FIG. 3 and FIG. 4 UB04 claim reimbursement forms. Specifically, the FIG. 4 UB04 claim reimbursement form derived using the second set of claim processing rules, is produced in 105 milliseconds and the FIG. 3 UB04 claim reimbursement form derived using the first set of claim processing rules, is produced in 101 milliseconds.

FIGS. 5 and 6 illustrate first and second different sets of claim processing rules used for processing a common set of input claim data to provide different claim reimbursement form data fields. Specifically, FIG. 6 illustrates the addition of rules on rows 603, 605 and 607 to the rules of FIG. 5 and used for processing EDI 8371 compatible claim transaction data. The added rules incorporate an operating physician (NM1 segment) together with associated reference (REF) segments, after an attending physician segment, to a claim transaction form. Rules processor 15 and comparator 35 of system 10 (FIG. 1) perform validation and initiate a form display highlighting form changes verifying rule changes work as desired. Rules processor 15 further determines that processing claim input data with the rules of FIG. 5 takes 76 milliseconds to process one claim input transaction and 201123 milliseconds (100.56 milliseconds per claim) to process the same claim input transaction 2000 times. In comparison, rules processor 15 further determines that processing claim input data with the rules of FIG. 6 takes 75 milliseconds to process the same claim input transaction and 198722 milliseconds (99.36 milliseconds per claim) to process the same claim input transaction 2000 times. Duration of rules execution for claim input data varies greatly for a number of reasons, such as start up time, time to set up execution or execution on disparate computer hardware. For example, the processing of the single set of claim input data 2000 times using the FIG. 5 rules compares unfavorably (201123 versus 198722 milliseconds) to using the proposed rule change embodied in the rules of FIG. 6.

In contrast, the rules of FIG. 5 take 352753 milliseconds (81.66 milliseconds per claim) to process different claim input transactions 4320 times and the rules of FIG. 6 take 370012 milliseconds (85.65 milliseconds per claim) to process different claim input transactions 4320 times. Therefore, the processing of the different sets of claim input data 4320 times using the FIG. 5 rules compares favorably (352753 versus 370012 milliseconds) to using the proposed rule change embodied in the rules of FIG. 6. The determination of duration of rules processing by processor 15 is advantageous in an Application Service Provider (ASP) environment involving processing of large numbers (e.g., tens of thousands of claims) as it provides a reliable performance predictor.

Figure 7:
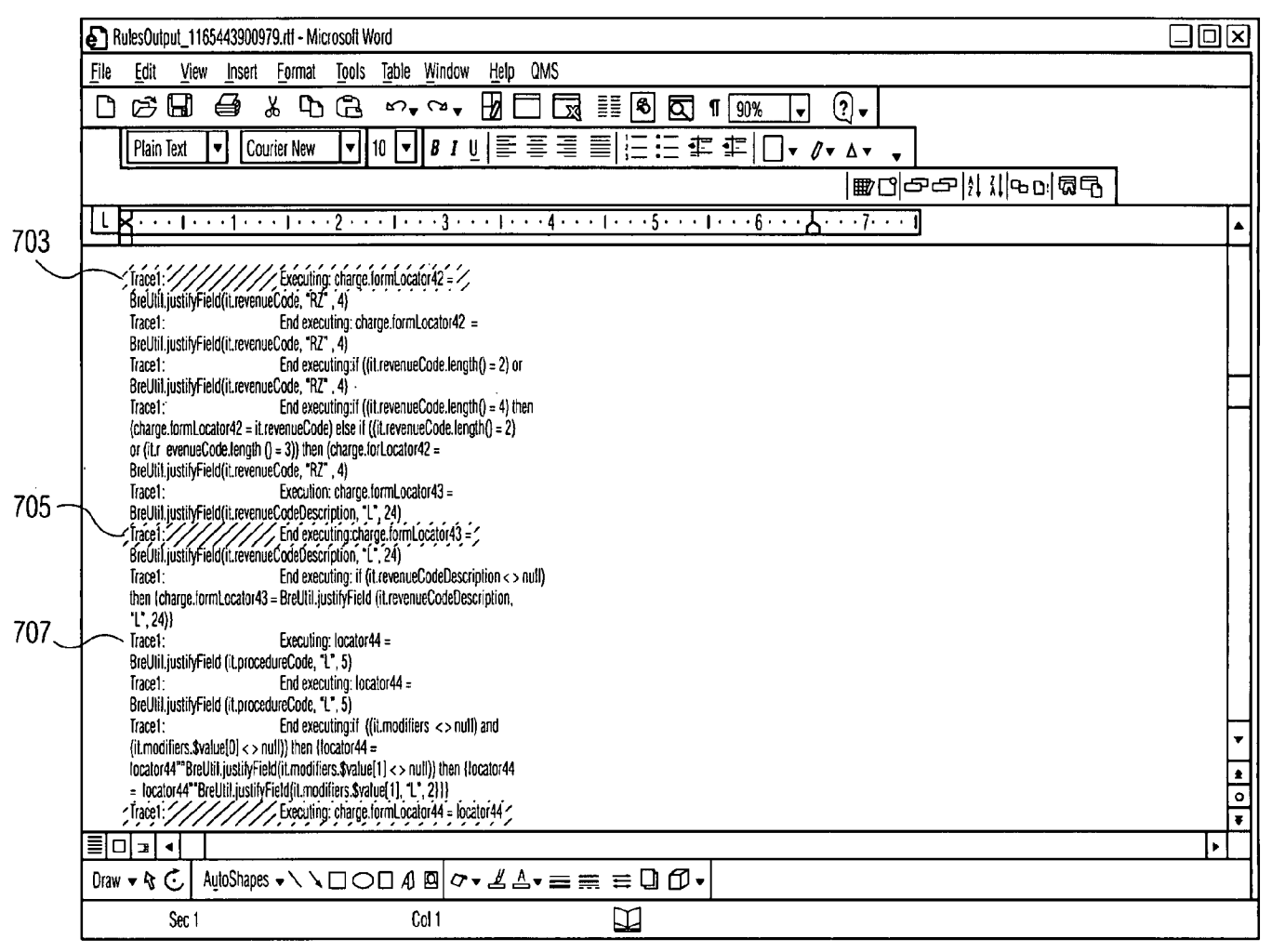

Trace log processor 39 (FIG. 1) provides a log that traces and records execution of claim processing rules processing claim data in a UB92 form to aid in debugging problems indicated in claim form data changes, for example. The log also indicates the sequence in which rules are executed to aid in problem identification. FIG. 7 shows a partial trace log recording a sequence of execution of rules in claim data processing including recording execution of rules beginning in rows 703, 705 and 707. Specifically, the diagnostic trace log indicates that rules for charge.formLocator42, charge.formLocator43, and charge.formLocator44 are executed in sequence as illustrated beginning in rows 703, 705 and 707 respectively.

System 10 (FIG. 1) enables an individual user to regression test validation of rule changes using claim input data saved in XML format in database 31. The claims in repository 31 cover the spectrum of examples of forms and transactions needed to validate the impact of rule changes. Output data of a regression test indicates differences associated with rule changes in terms of form and transaction logic changes and run time differences. A trace log provided by trace processor 39 indicates a problem caused by one or more rules failing to execute. System 10 advantageously eliminates a need to validate processing rules in a (non-test) production environment with the attendant risk of compromising processing of real claims and negatively impacting hospital revenue collection, for example. System 10 is usable in conjunction with insurance payer claims adjudication applications, for example and advantageously includes a large sample of input claims supporting rule processing validation.

In operation, Regular Hospital USA is notified of a change to Box 38 for Payer1 Healthcare UB04 claims. Payer1 wants a particular address to show in Box 38 on the UB04 form for radiation therapy claims. A user from Regular Hospital USA has access to the rules that produce the UB04 in system 10. The user copies the rule that handles Box 38 and changes it so that the UB04 form for Payer1 Healthcare includes the particular address whenever the claim contains a service line for radiation therapy. The user tests the change using a number of input test claims as test cases. After testing the rule change on a dozen test claims, for example, a user readily verifies that Box 38 change is the only change that occurs and only for a UB04 form destined to be sent to the Payer1 organization. The validated rule change is provided to a production claim processing system.

Figure 9:
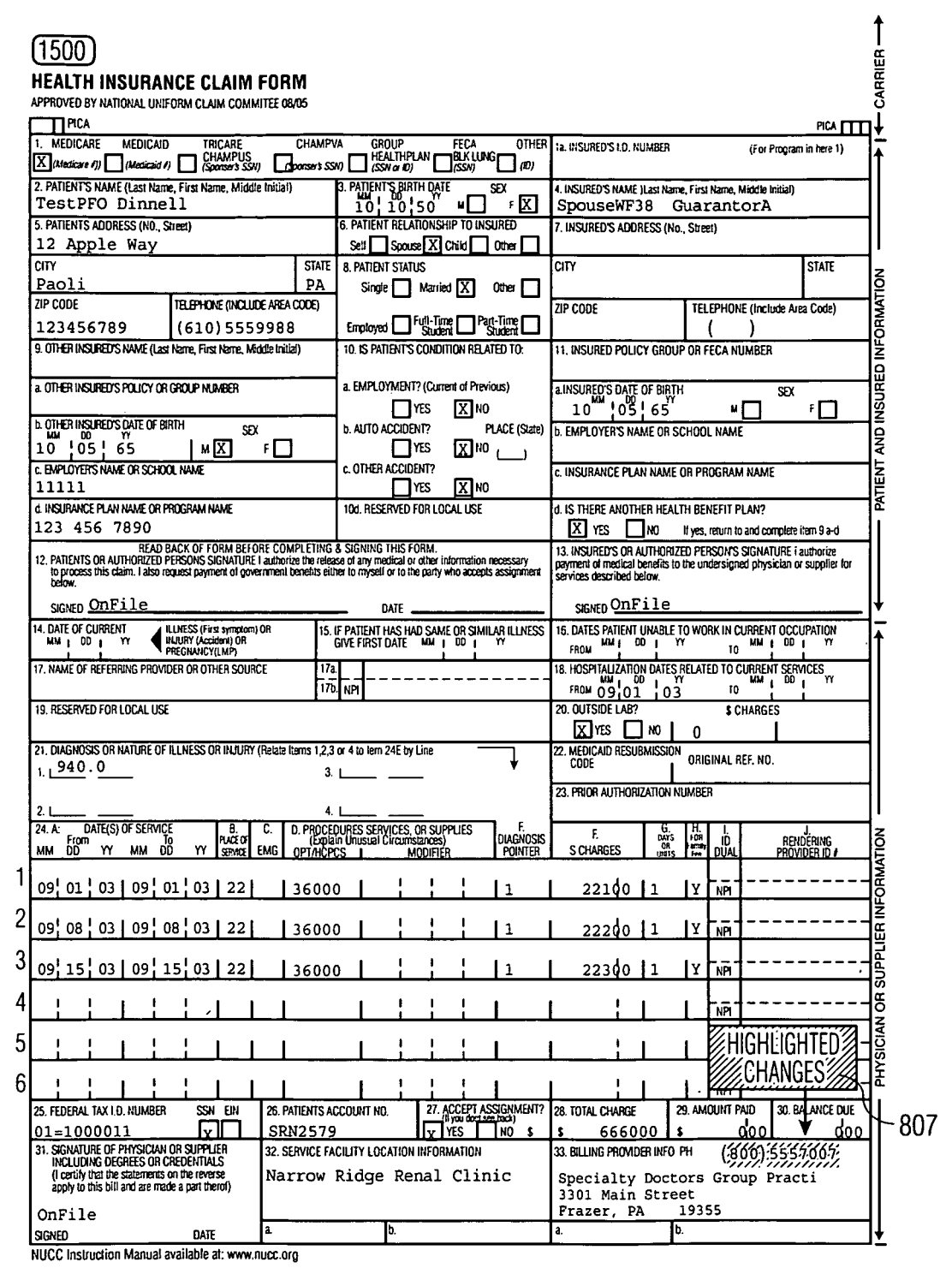

FIGS. 8 and 9 illustrate a particular claim reimbursement form (form 1500) prepared using system 10 employing first and second different sets of claim processing rules based on a common set of input claim data. In this illustration, an Application Service Provider (ASP) user implements use of a new claim form (a 1500 claim form) to support annual rule changes required by a regulatory authority. A healthcare provider organization desires to verify that a claim processing rule change works when applied to special rules for Payer2 organization claim forms for renal dialysis patients. A healthcare provider organization imports standard rule changes into system 10 and executes several iterations of claim form renal dialysis examples to verify that the special rules continue to work with annual rule changes required by the regulatory authority. In response to successful validation, the healthcare provider organization documents that the change did not adversely affect the category of patients concerned. Specifically, FIG. 9 highlights (e.g., in yellow or with any other visual attribute) that the only annual rule resultant change 807 to the 1500 form is to add a billing provider phone number in Box 33. This billing provider phone number is absent from corresponding 1500 form of FIG. 8 generated by the first set of claim processing rules. Comparator 35 enables a user to readily determine the change by automatically identifying and highlighting the change following processing of the common set of input claim data by rules processor 15.

Figure 10:
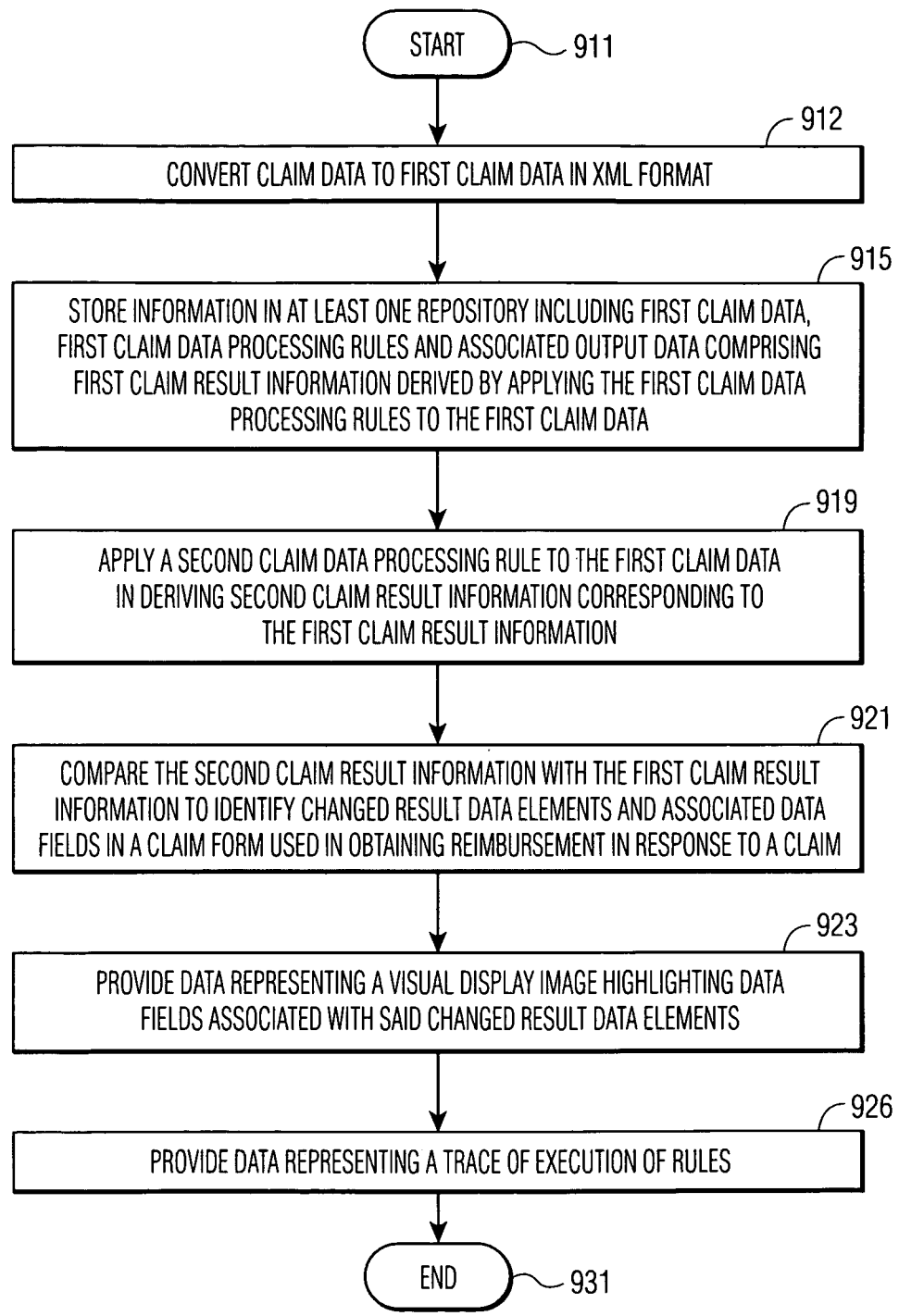
FIG. 10 shows a flowchart of a process performed by a system for evaluating processing rules, according to invention principles.

FIG. 10 shows a flowchart of a process performed by system 10 for evaluating processing rules. In step 912 following the start at step 911, a transformation processor in rules processor 15 (FIG. 1) converts claim data to first claim data in Extensible Markup Language (XML) compatible format. In step 915, system 10 stores information in at least one repository 17 including the first claim data, first claim data processing rules and associated output data comprising first claim result information derived by applying the first claim data processing rules to the first claim data. The information in at least one repository 17 includes multiple sets of first claim data. User interface 26, together with workstation 12, enables a user to select the first claim data from the multiple sets of first claim data. The first claim data processing rules comprise payer organization rules and the information in at least one repository 17 includes user organization rules including at least one of, (a) user organization specific rules and (b) user organization customized rules. The information in at least one repository 17 also includes multiple sets of sets of first claim data processing rules and associated output data comprising multiple sets of first claim result information. The result information is derived by applying corresponding sets of the multiple sets of first claim data processing rules to corresponding individual sets of the multiple sets of the first claim data.

Further, the first claim result information is derived by applying the payer organization rules and the user organization rules to the first claim data. The information in at least one repository 17 also includes changed rules derived from rule information provided by a regulatory authority associated with setting reimbursement rates for treatment services and includes data indicating a first processing time duration associated with applying the first claim data processing rules to the first claim data.

In step 919, rules processor 15 applies one or more second claim data processing rules, derived from a source, to the first claim data in deriving second claim result information corresponding to the first claim result information. Further, rules processor 15 applies one or more second claim data processing rules, together with rules of a set of the first claim data processing rules, to a selected set of the first claim data in deriving a set of second claim result information corresponding to a set of the first claim result information. Rules processor 15 automatically determines a second processing time duration associated with applying the one or more second claim data processing rules to the first claim data. Comparator 35, in step 921, compares the second claim result information with the first claim result information to identify changed result data elements and associated data fields in a claim form used in obtaining reimbursement in response to a claim. In step 923, output processor 34 provides data representing a visual display image highlighting data fields associated with the changed result data elements. Output processor 34 also provides data representing an electronic transaction message highlighting data fields associated with the changed result data elements. Output processor 34 further provides data indicating the first and second time durations. In step 926, trace processor 39 provides data representing a trace of execution of rules including the second claim data processing rule applied in processing the first claim data enabling a user to verify the second claim data processing rule had been executed. The process of FIG. 10 terminates at step 931.

The systems and processes of FIGS. 1-10 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system automatically evaluates the effect of changing claim data processing and claim form completion and generation rules by identifying and highlighting changes in claim data and changes in data in a prepared form to facilitate user identification of the changes. The processes and applications may, in alternative embodiments, be located on one or more (e.g., distributed) processing devices accessing a network linking the elements of FIG. 1. Further, any of the functions and steps provided in FIGS. 1-10 may be implemented in hardware, software or a combination of both and may reside on one or more processing devices located at any location of a network linking the elements of FIG. 1 or another linked network, including the Internet.

What is claimed is:

1. A system including at least one hardware processing device for simulating and validating integrated system performance for changes to processing rules used for processing a claim form and data related to reimbursement for provision of healthcare to a patient by specific payer organizations, comprising:

at least one repository of information including:

a validation claim data group comprising a plurality of claims previously processed in a non-simulated healthcare reimbursement system, a validation set of claim data processing rules, wherein said validation set of claim data processing rules represents a version of claim data processing rules used in said non-simulated healthcare reimbursement system for processing healthcare reimbursement claims, and a validation output data set comprising validation claim result data derived from processing said plurality of claims of said validation claim data group according to said validation set of claim data processing rules, said validation output data set comprising a validation processing time duration corresponding to a processing time required to process said plurality of claims data;

a set of modified claim data processing rules comprising one or more changes to a code for claim data processing rules for use in said non-simulated healthcare reimbursement system, said set of modified claim data processing rules including at least one claim data processing rule that is different from at least one claim data processing rule of said validation set of claim data processing rules;

a rules processor, in a simulated healthcare reimbursement system, for:

processing said plurality of claims of said validation claim data group according to said set of modified claim data processing rules and generating modified claim result data;

based on the modified claim result data, generating a modified output data set, said modified output data set comprising:

a modified processing time duration corresponding to a processing time required to process said plurality of modified claims according to said set of modified claim data processing rules data, said modified processing time duration being stored in said at least one repository of information for evaluation of claim processing throughput;

a comparator for validating said set of modified claim data processing rules, said comparator being configured to:

compare said modified output data set with said validation output data set to identify changed claim data elements between said validation output data set and said modified output data set; and determine a change in rules processing duration by comparing said modified processing time duration to said validation processing time duration; and an output processor for providing a validated output form that includes an indication of said change in rules processing duration and said changed claim data elements, and storing said validated output form in a validated output form directory.

2. A system according to claim 1, wherein said output processor provides data representing an electronic transaction message highlighting data fields associated with said changed data elements.

3. A system according to claim 1, wherein said at least one repository of information includes a plurality of sets of validation claim data groups and includes a user interface enabling a user to select said validation claim data group from said plurality of sets of validation claim data groups.

4. A system according to claim 1, including a trace processor for providing data representing a trace of execution of rules including said modified claim data processing rules applied in processing said validation claim data group and for verifying that said modified claim data processing rules have been executed.

5. A system according to claim 1, wherein said validation claim data group is in Extensible Markup Language (XML) compatible format and including a transformation processor for converting claim data to said validation claim data group in XML format.

6. A system according to claim 1, wherein said validation claim data processing rules comprise payer organization rules.

7. A system according to claim 6, wherein said payer organization rules include at least one of, (a) payer organization specific rules and (b) payer organization customized rules.

8. A system according to claim 1, wherein said modified claim data processing rules comprise payer organization rules derived from rule information provided by a regulatory authority associated with setting reimbursement rates for treatment services.

9. A system according to claim 1, including a source of a plurality of second claim data processing rules, wherein said rules processor applies said second claim data processing rules to said validation claim data group in deriving a plurality of second claim output data.

10. A system including at least one hardware processing device for simulating integrated system performance for changes to processing rules used for processing claim transaction message data related to reimbursement for provision of healthcare to a patient by specific payer organizations, comprising:

at least one repository of information including validation claim data, validation claim data processing rules and associated validation output data comprising a validation processing time duration corresponding to a processing time required to execute a plurality of iterations of applying said validation claim data processing rules to said validation claim data, wherein said validation claim data processing rules comprise payer organization rules and user organization specific rules;

a source of a plurality of modified claim data processing rules comprising:

a first set of modified claim data processing rules including at least one claim data processing rule that is different from at least one claim data processing rule of said validation claim data processing rules; and a second set of modified claim data processing rules including at least one claim data processing rule that is different from at least one claim data processing rule of said first set of modified claim data processing rules and that is different from at least one claim data processing rule of said validation claim data processing rules; a rules processor for executing a plurality of iterations of said first set of modified claim data processing rules and said second set of modified claim data processing rules and generating a first modified output data set and a second modified output data set by:

applying said first set of modified claim data processing rules and said second set of modified claim data processing rules to said validation claim data and executing said plurality of iterations;

automatically determining a first processing time duration for said first set of claim data processing rules corresponding to a processing time required to execute said plurality of iterations of said first set of claim data processing rules; and automatically determining a second processing time duration for said second set of claim data processing rules corresponding to a processing time required to execute said plurality of iterations of said second set of claim data processing rules;

generating said first modified output data set comprising said first processing time duration and said second modified output data set comprising said second processing time duration; a comparator for:

comparing said first modified output data set with said validation output data and with said second modified output data set;

comparing said second modified output data set with said validation output data and with said first modified output data set; and identifying changed result data elements within one or more data fields between said validation output data, said first modified output data set and said second modified output data set; a trace processor for producing a diagnostic trace log for tracing one or more execution errors of said first modified claim data processing rules and said modified claim data processing rules; and an output processor for providing an indication of said first processing time duration and said second processing time duration, data representing said diagnostic trace log, and an electronic transaction message indicating said changed result data elements.

11. A system according to claim 10, wherein said validation claim data is in Extensible Markup Language (XML) compatible format and including a transformation processor for converting claim data to said validation claim data in XML format.

12. A system including at least one hardware processing device, for simulating integrated system performance for changes to processing rules used for processing a claim form and data related to reimbursement for provision of healthcare to a patient by specific payer organizations, comprising:

at least one repository including:

a model payer organization rules unit for isolating model payer organization rules, such that said model payer organization rules are protected from alteration, a user organization rules unit, a plurality of sets of production claim data, a plurality of sets of production claim data processing rules, wherein each set of said plurality of sets of production claim data processing rules corresponds to a set of said plurality of sets of production claim data, associated output data comprising a plurality of sets of production claim result information representing a plurality of production processing time durations, wherein each set of said plurality of sets of production claim result information corresponds to output data obtained by processing said each set of said plurality of sets of production claim data processing rules and said corresponding set of said plurality of sets of production claim data;
a source of a set of modified claim data processing rules, said set of modified claim data processing rules being compatible with said model payer organization rules;
a rules processor for applying said set of modified claim data processing rules to a selected set of said production claim data in deriving a set of modified claim result information representing modified processing time duration;
a comparator for comparing said set of modified claim result information with at least one set of production claim result information to identify a changed processing time duration;
a trace processor for producing a diagnostic trace log for tracing an execution of said at least one set of production claim data processing rules and said modified claim data processing rules, said trace log including an indication of a failure of the execution of one or more rules; and
an output processor for providing an indication of said changed processing time duration, data representing said diagnostic trace log, and an electronic transaction message indicating said changed result data elements.

13. One or more hardware processors storing non-transitory machine-readable instructions that, when used by one or more computing devices, cause the one or more computing devices to perform a method for simulating integrated system performance for changes to processing rules used for processing claim data related to reimbursement for provision of healthcare to a patient by specific payer organizations, comprising the activities of:
storing in at least one repository, information including first claim data, a set of first claim data processing rules and associated output data comprising first claim result information representing a first processing time duration, wherein a performance throughput of said set of first claim data processing rule has been validated, and a first claim form comprising a plurality of data fields individually including claim data elements derived by applying said first claim data processing rules to said first claim data;
storing a set of second claim data processing rules;
applying, by a rules processor, said set of second claim data processing rules to said first claim data in deriving second claim result information representing a second processing time duration, and a second claim form comprising a plurality of data fields individually including claim data elements and corresponding to said first claim result information;
comparing said second claim result information with said first claim result information to identify a changed processing time duration, and changed result data elements including change in both format of said plurality of data fields and values of said claim data elements within said data fields between said first claim form and said second claim form;
producing, by a trace processor, for a diagnostic trace log for tracing an execution of said set of first claim data processing rules and said second claim data processing rules, the trace log including an indication of a failure of the execution of one or more rules;
providing, via an output processor, data representing a visual display of said changed processing time duration, said second claim form highlighting data fields associated with said changed result data elements in said second claim form, and said diagnostic trace log; and
upon validating said second set of claim data processing rules, providing said second set of claim data processing rules to a production claim processing system for processing a plurality of non-test claims.

* * * * *